United States Patent
van Klooster et al.

(10) Patent No.: US 10,495,501 B2
(45) Date of Patent: Dec. 3, 2019

(54) ULTRASONIC TRANSDUCER WITH EMITTING ELEMENT

(71) Applicant: Krohne AG, Basel (CH)

(72) Inventors: Jeroen Martin van Klooster, Tiel (NL); Arie Huijzer, Sliedrecht (NL)

(73) Assignee: KROHNE AG, Basel (CH)

( * ) Notice: Subject to any disclaimer, the term of this patent is extended or adjusted under 35 U.S.C. 154(b) by 230 days.

(21) Appl. No.: 15/493,221

(22) Filed: Apr. 21, 2017

(65) Prior Publication Data

US 2017/0307426 A1 Oct. 26, 2017

(30) Foreign Application Priority Data

Apr. 22, 2016 (DE) .......................... 10 2016 107 471

(51) Int. Cl.
| | | |
|---|---|---|
| *G01F 1/66* | (2006.01) | |
| *G10K 9/122* | (2006.01) | |
| *B06B 1/06* | (2006.01) | |
| *H04R 1/30* | (2006.01) | |
| *H04R 1/34* | (2006.01) | |

(Continued)

(52) U.S. Cl.
CPC ............ *G01F 1/663* (2013.01); *B06B 1/0644* (2013.01); *G01F 1/66* (2013.01); *G01F 1/662* (2013.01); *G10K 9/122* (2013.01); *H04R 1/30* (2013.01); *H04R 1/34* (2013.01); *H04R 7/14* (2013.01); *H04R 17/00* (2013.01)

(58) Field of Classification Search
CPC ............ G01F 1/663; G01F 1/662; G01F 1/66; G10K 9/122; H04R 1/30; H04R 1/34; H04R 7/14; H04R 17/00; B06B 1/0644–0685

USPC .................. 73/596–600, 632–644, 652, 654, 73/861.27–861.31

See application file for complete search history.

(56) References Cited

U.S. PATENT DOCUMENTS

| | | | |
|---|---|---|---|
| 3,891,869 A | 6/1975 | Scarpa | |
| 4,173,725 A * | 11/1979 | Asai ...................... | B06B 1/0618 310/325 |

(Continued)

FOREIGN PATENT DOCUMENTS

| | | |
|---|---|---|
| JP | H06-253396 A | 9/1994 |
| JP | H10-271594 A | 10/1998 |

(Continued)

*Primary Examiner* — Robert R Raevis
(74) *Attorney, Agent, or Firm* — David S. Safran; Roberts Mlotkowski Safran Cole & Calderon, P.C.

(57) ABSTRACT

An ultrasonic transducer for an ultrasonic flow meter, with a transducer housing, with a transducer element for generating and/or for receiving ultrasonic signals and with an emitting element, the emitting element being exposed to ultrasonic signals at least indirectly from the transducer element and emitting the ultrasonic signals via one end face on one front side of the emitting element into the vicinity bordering the ultrasonic transducer and/or the emitting element picking up ultrasonic signals from the vicinity via one end face on one front side of the emitting element and transmitting them at least indirectly to the transducer element. A good directional action in spite of small dimensions is achieved by the emitting element being connected to the transducer housing via a connecting element and being free standing on its periphery on the front side such that it can oscillate freely on the periphery.

15 Claims, 5 Drawing Sheets

(51) Int. Cl.
*H04R 7/14* (2006.01)
*H04R 17/00* (2006.01)

(56) References Cited

U.S. PATENT DOCUMENTS

| 4,556,814 | A | * | 12/1985 | Ito ........................... B06B 1/067 |
| | | | | 310/326 |
| 6,766,899 | B1 | | 7/2004 | Guldenfels |
| 8,740,476 | B2 | | 6/2014 | Mori et al. |
| 9,335,491 | B2 | | 5/2016 | Mori et al. |
| 2016/0223756 | A1 | | 8/2016 | Mori et al. |

FOREIGN PATENT DOCUMENTS

| WO | 2014/202333 A1 | 12/2014 |
| WO | 2016/066343 A1 | 5/2016 |
| WO | 2017/029078 A1 | 2/2017 |

* cited by examiner

ULTRASONIC TRANSDUCER WITH EMITTING ELEMENT

BACKGROUND OF THE INVENTION

Field of the Invention

The invention relates to an ultrasonic transducer for an ultrasonic flow meter, with a transducer housing, with a transducer element for generating and/or for receiving ultrasonic signals and with an emitting element, the emitting element being exposed to ultrasonic signals at least indirectly from the transducer element and emitting the ultrasonic signals via one end face on one front side of the emitting element into the vicinity bordering the ultrasonic transducer and/or the emitting element picking up ultrasonic signals from the vicinity via one end face on one front side of the emitting element and transmitting them at least indirectly to the transducer element.

Description of Related Art

Ultrasonic transducers of the type under consideration have been known for a long time. These ultrasonic transducers are used, for example, for distance measurement or also for flow rate measurement. Flow rate measurements are often based on the Doppler effect or on measurement of propagation time difference.

Depending on the aggregate state of the transmission medium, different frequencies of the acoustic signal in the ultrasonic range can be especially advantageous. This is associated, for example, with the attenuation of the ultrasonic signals which is dependent on the aggregate state of the medium. In gaseous media, ultrasonic signals of lower frequency are more readily used than in liquid media since low frequency ultrasonic signals are less attenuated in gaseous media than higher frequency signals.

The frequency of the ultrasonic signals which are to be emitted or received also has an effect on the dimensions of the ultrasonic transducer. It is plausible that ultrasonic transducers are mechanically designed such that the mechanically resonant components which are designed for signal emission and injection, in particular the emitting element, operate at the desired ultrasonic frequency as much as possible in the region of the natural frequency of one oscillation mode. Ultrasonic transducers which operate with lower frequencies accordingly generally have larger dimensions than ultrasonic transducers which operate with higher frequencies. Altogether one design objective however consists in implementing mechanical structures which are as space-saving as possible.

In many cases, it is likewise desirable for the ultrasonic signal which has been radiated into the medium to be emitted in as dedicated manner as possible from the ultrasonic transducer, therefore for the ultrasonic transducer to have a directional action as great as possible. Preferably, the signal power should be emitted in the manner of a lobe in a small solid angle, minor lobes being avoided. A wide major lobe and minor lobes are often associated with the disadvantage that the signals which have been emitted in their edge region are reflected on installed parts or pipe or receptacle walls and interfere with the actual useful signals.

SUMMARY OF THE INVENTION

Accordingly, a primary object of the present invention is to devise an ultrasonic transducer which achieves good directional action in spite of small dimensions.

This object is achieved in the ultrasonic transducer, first of all, essentially in that the emitting element is connected to the transducer housing via a connecting element and is freely standing on its periphery on the front side such that it can oscillate freely on the periphery.

The structural measure in accordance with the invention that the emitting element can freely oscillate on its periphery greatly enlarges the aperture of the ultrasonic transducer compared to known structures. It is known from the prior art that the emitting element is connected on its periphery to the housing all around, and therefore, can only oscillate centrally, similar to an oscillating membrane mounted outside over the periphery in a drum. Because the emitting element is no longer fixed on the peripheral side, it is possible for it to oscillate with its entire end face, as a result of which the entire end face can contribute equally to ultrasonic generation and emission. In this way the effective aperture of the ultrasonic transducer is greatly enlarged, with the size of the end face unchanged and without the outside diameter of the ultrasonic transducer having to be increased. The result is an ultrasonic transducer with a distinctly improved directional action.

One preferred configuration of the ultrasonic transducer in accordance with the invention is wherein the emitting element is made as a plunger, the plunger having a plunger shaft and a plunger plate, the plunger plate encompassing the end face and the plunger extending at least in part outside the transducer housing. The plunger shaft preferably has a first end and a second end, the transducer element preferably being located on the first end and the plunger plate being located on the second end. The transducer element exposes the plunger on the first end of the plunger shaft to ultrasonic signals which pass through the plunger and are emitted on the front side of the plunger plate into the vicinity. Preferably, the plunger is made and arranged such that the entire plunger plate is located outside the transducer housing. Furthermore, the plunger plate preferably has a greater diameter than the plunger shaft. Also, the center axis of the plunger shaft preferably corresponds to the center axis of the plunger plate. Because the plunger plate is located outside the transducer housing, the diameter of the plunger plate can also be chosen to be greater than the diameter of the transducer housing. The configuration of the plunger plate is accordingly independent of the configuration of the transducer housing, so that implementation of a larger emitting area—therefore of the end face—is easily enabled.

Another embodiment is wherein the plunger shaft projects at least in part into the transducer housing. Preferably, the plunger shaft then projects centered into the transducer housing, therefore peripherally on its edge has essentially the same distance to the transducer housing. Essentially therefore, because the plunger shaft can be made differently. Thus one preferred configuration of the ultrasonic transducer in accordance with the invention calls for the plunger shaft to be made columnar. One configuration of the ultrasonic transducer in accordance with the invention is wherein the plunger shaft has a round, a rectangular or a polygonal cross section.

The connecting element is arranged such that in one configuration it connects the plunger shaft to the transducer housing. This ensures that the plunger shaft can oscillate completely freely and cannot be disrupted by the connecting element or the oscillations are not attenuated by the connecting element. In another configuration conversely it is provided that the connecting element connects the plunger plate to the transducer housing. Since it is provided in accordance with the invention that the emitting element on its front side which encompasses the emitting end face can oscillate freely, the connecting element is not connected on the outer edge with the plunger plate, rather the connection is made in the middle of the plunger plate.

Another configuration of the ultrasonic transducer in accordance with the invention is wherein the connecting element is made as a membrane. The membrane has a small thickness and surrounds the emitting element preferably around it entire periphery. Furthermore, this membrane is preferably elastic.

As stated above, the ultrasonic transducer or the resonant components of the ultrasonic transducer, like essentially any resonant system, it has different oscillation modes. In one preferred embodiment, the ultrasonic transducer is designed such that, in the fundamental mode, essentially the connecting element executes the oscillations, while the emitting element is essentially rigid. The emitting element therefore moves as a whole relative to the housing to which it is connected via the connecting element. The natural frequency of the ultrasonic transducer here is proportional to the stiffness of the membrane and inversely proportional to the mass of the emitting element, in particular of the plunger. In order to implement a low fundamental natural frequency—natural frequency of the fundamental mode—which is especially advantageous in the measurement of gaseous media, in one embodiment it is therefore provided that the stiffness of the connecting element, for example, in the form of a membrane, be reduced. This is accomplished in accordance with the invention by the membrane area, therefore the area of the connecting element which is made as a membrane, being made larger.

In order to implement a larger membrane area, accordingly in one preferred configuration it is provided that the membrane be made corrugated. Here corrugated is to be understood as the membrane having elevations and/or depressions which can however also be implemented as steps, therefore can be formed by edges.

One additional or also independent possibility of enlarging the membrane area is implemented in an especially preferred configuration of the ultrasonic transducer in accordance with the invention in that the plunger shaft has a cross section which tapers at least partially towards the side which is facing away from the transducer element. Especially preferably the plunger shaft is shaped as an acoustic horn. Then, the membrane preferably acts on the site with the smallest cross section. The configuration of the plunger shaft as an acoustic horn however has not only the effect of enlarging the membrane area. Rather, and also advantageously for its own sake, making the plunger shaft as an acoustic horn accomplishes the matching of the plunger impedance to the impedance of the medium which is to be measured. Accordingly the acoustic horn acts as an acoustic transformer.

One preferred configuration of the ultrasonic transducer in accordance with the invention is wherein the transducer housing and the connecting element and/or the connecting element and the emitting element are produced from one piece. For this purpose, not just any geometry of the different regions of the ultrasonic transducer is suitable, in particular rotationally-symmetrical geometries with cylindrical base elements, preferably without undercuts, are recommended here.

In order to simplify production and also to be able to implement complicated geometries, in another preferred configuration of the ultrasonic transducer in accordance with the invention, it is provided that the transducer housing and the connecting element and/or the connecting element and the emitting element are welded to one another. The individual parts can therefore be manufactured independently of one another and are only then joined together. This can be advantageous.

In order to monitor the oscillations, in one configuration of the ultrasonic transducer in accordance with the invention, it is provided that there is an elastic material between the emitting element and the connecting element. The elastic material should of course be mechanically attenuating for the frequencies which are to be suppressed so that attenuation is caused which has an effect in particular on higher oscillation modes.

The elastic material can be implemented for example, by an elastic mass which fills the intermediate space. Especially preferably the elastic material is implemented by at least one oscillation-attenuating O-ring.

In particular, there are a plurality of possibilities for configuring and developing the ultrasonic transducer in accordance with the invention. In this regard reference is made to the following description in conjunction with the accompanying drawings.

DETAILED DESCRIPTION OF THE INVENTION

Figure 1A:
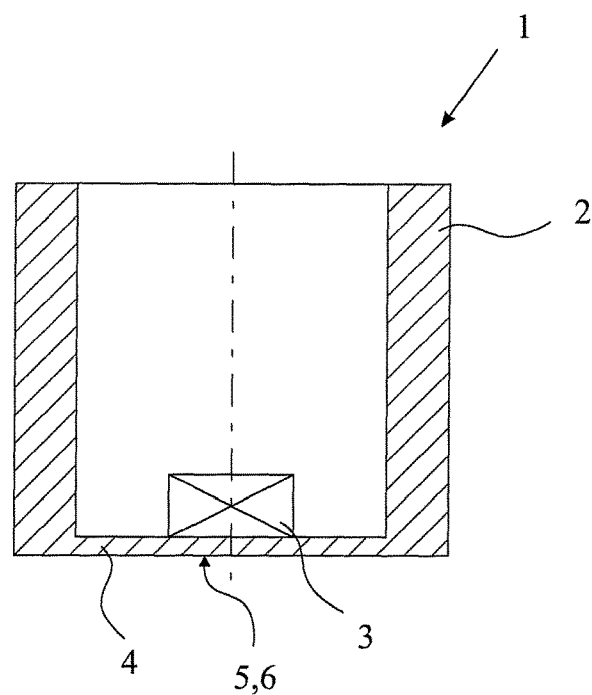
FIG. 1a shows a classic ultrasonic transducer from the prior art in the static state.

FIG. 1a shows an ultrasonic transducer 1 which is known from the prior art in a simplified representation. The ultrasonic transducer 1 comprises a transducer housing 2 and a transducer element 3. Ultrasonic signals are generated by the transducer element 3 and via an emitting element 4, made here as an ultrasonic window, are emitted into the vicinity which borders the ultrasonic transducer 1. Emission takes place via the end face 5 of the emitting element 4.

Figure 1B:
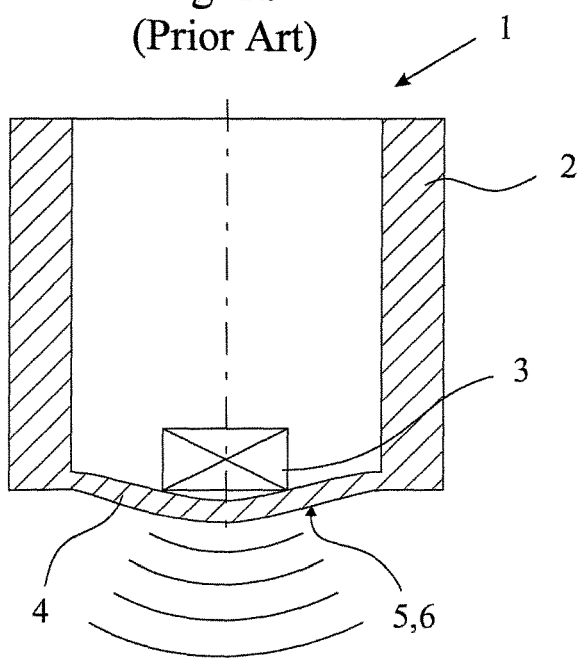
FIG. 1b shows the ultrasonic transducer which is shown in FIG. 1a in the dynamic state.

FIG. 1b shows a dynamic state of the ultrasonic transducer 1. The ultrasonic signals are emitted via the end face 5. As is clearly apparent in FIG. 1b, the end face 5 of the ultrasonic transducer 1 known from the prior art oscillates only centrally since the emitting element 4 is connected to the transducer housing 2 over its entire periphery. By the mechanical boundary condition of fixing the emitting element 4 it is sketched out that the emitting element 4 always has its greatest oscillation amplitude in its central region, the oscillation amplitude decreasing towards the periphery of the emitting element 4.

Figure 2A:
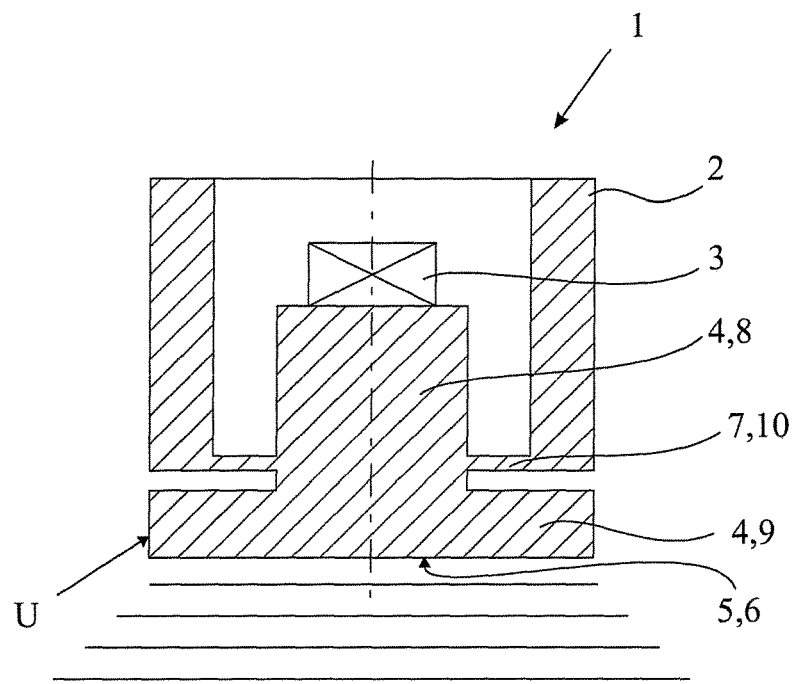
FIG. 2a shows a first configuration of an ultrasonic transducer in accordance with the invention in the static state or in the state of a fundamental mode.

FIG. 2a shows an ultrasonic transducer 1 in accordance with the invention. The ultrasonic transducer 1 has a transducer housing 2 and a transducer element 3. The transducer element 3 generates ultrasonic signals and transmits them to an emitting element 4. The signals are then emitted via the end face 5 on the front side 6 of the emitting element 4 into the vicinity which borders the ultrasonic transducer 1. Furthermore, the ultrasonic transducer 1 is also described as a transmitter, but the use of the same ultrasonic transducer 1 as a receiver is also possible. Then, the emitting element 4 via its end face 5 on the front side 6 picks up ultrasonic signals from the vicinity and transmits them to the transducer element 3; this is accomplished here by a piezoelement. Thus, mechanical oscillations which have been picked up without constraint can be converted into electrical signals.

The emitting element 4 is connected via one connecting element 7 to the transducer housing 2. The connecting element 7 is made as an elastic resonant membrane 1Q.

The connecting element 7 is connected to the emitting element 4 such that the emitting element 4 on its periphery U is freely standing on the front side 6 and can oscillate freely on its periphery U. This means that the emitting element 4 on its periphery U can move freely and the periphery U of the emitting element 4 in any case is not hampered from moving the entire emitting element 4 at the same time. Because the emitting element 4 is no longer peripherally fixed, it is possible for it to oscillate with its entire end face 5, as a result of which the entire end face 5 can contribute equally to ultrasonic generation and emission. In this way the effective aperture of the ultrasonic transducer 1 is greatly enlarged, with the size of the end face 5 unchanged and without the outside diameter of the ultrasonic transducer 1 having to be increased. This becomes especially clear in the direct comparison of FIG. 1 and FIG. 2. In FIG. 2 an ultrasonic transducer 1 with a distinctly improved directional action results, since parallel wave fronts can be generated over the entire region of the end face 5. This is fundamentally not possible in the ultrasonic transducer 1 according to FIG. 1.

The emitting element 4, itself, is made as a plunger and has a plunger shaft 8 and a plunger plate 9. The plunger shaft 8 extends into the transducer housing 2, conversely, the plunger plate 9 is located outside the transducer housing 2. This makes it possible for the plunger plate 9 to have even a larger diameter than the inside diameter of the housing 2. Thus, the size of the end face 5 is independent of the dimensions of the transducer housing 2. But, advantages also arise when the end face 5 is chosen not to be greater than the inside diameter of the housing 2; this is due to the freedom of movement of the periphery U of the emitting element 4 in the region of the plunger plate 9.

FIG. 2a shows how straight, parallel phase fronts of the ultrasonic oscillations which accompany an outstanding directional action can be implemented by the structure.

Figure 2B:
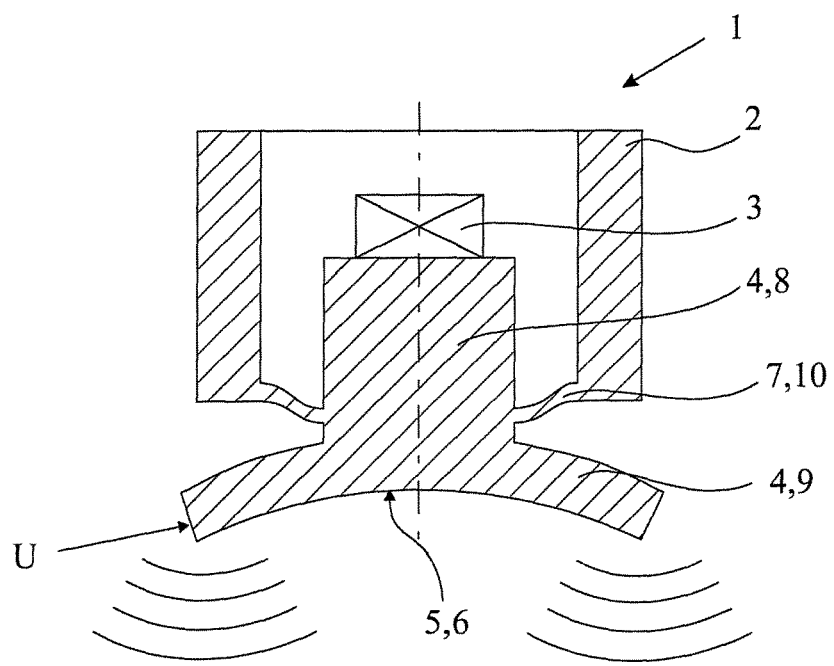
FIG. 2b shows the ultrasonic transducer shown in FIG. 2a in the dynamic state in a higher oscillation mode.

FIG. 2b shows the ultrasonic transducer 1 which is shown in FIG. 2a in the dynamic state in a higher oscillation mode which can be excited at the same time with the fundamental oscillation mode. Therefore, two superimposed oscillation modes of the ultrasonic transducer 1 are shown. In the first mode, essentially the membrane 10 is deflected or excited to oscillations, in the second mode essentially the plunger plate 9 oscillates in itself. This is shown exaggerated in the FIG. 2b using the bent plunger plate 9 whose peripheral region U is deflected downward relative to the central region of the plunger plate 9.

Figure 3:
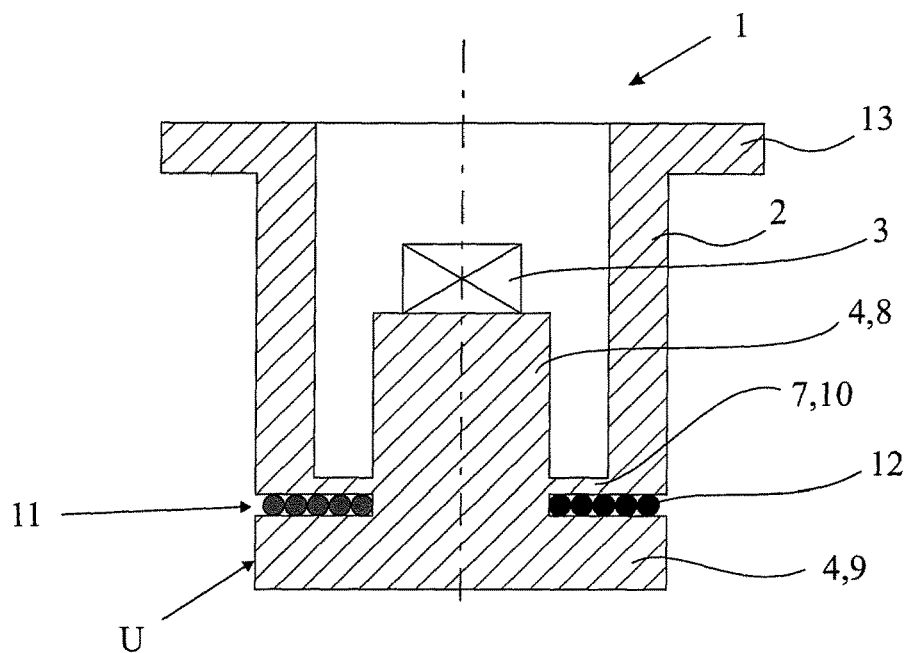
FIG. 3 shows a second configuration of an ultrasonic transducer in accordance with the invention with an elastic element.

FIG. 3 shows a configuration of the ultrasonic transducer 1 in accordance with the invention in which there are O-rings 12 in the region 11 between the connecting element 7 which is made as a membrane 10 and the plunger plate 9. The O-rings serve in particular not to attenuate the harmonics which have been directly excited by the transducer element 3.

Furthermore the ultrasonic transducer 1 has a flange 13 for attachment of the ultrasonic transducer 1.

The natural frequency of the ultrasonic transducer 1 is proportional to the stiffness of the connecting element 7 which is made as a membrane 10. In order to reduce the stiffness of the membrane 10 and to shift the natural frequency of the ultrasonic transducer 1 to lower frequencies, the embodiment of the ultrasonic transducer shown in FIG. 4 has a plunger shaft 8 which is shaped as an acoustic horn 14. The plunger shaft 8 tapers towards its side which is facing away from the transducer element 3. The membrane 10 is connected to the plunger shaft 8 at the site with the smallest diameter. In this way the moveable area of the membrane 10 of the connecting element 7 is structurally enlarged.

Figure 4:
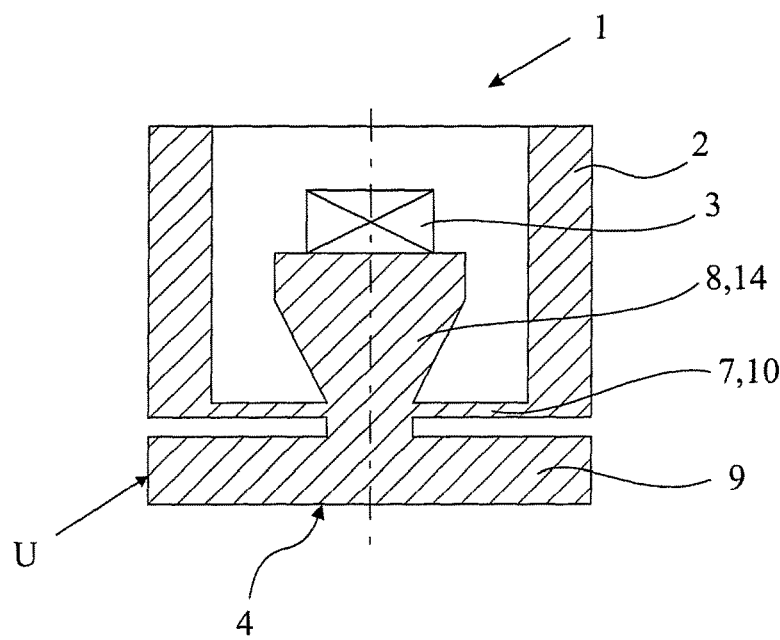
FIG. 4 shows a third configuration of an ultrasonic transducer in accordance with the invention in which the plunger shaft is advantageously shaped.
Figure 5:
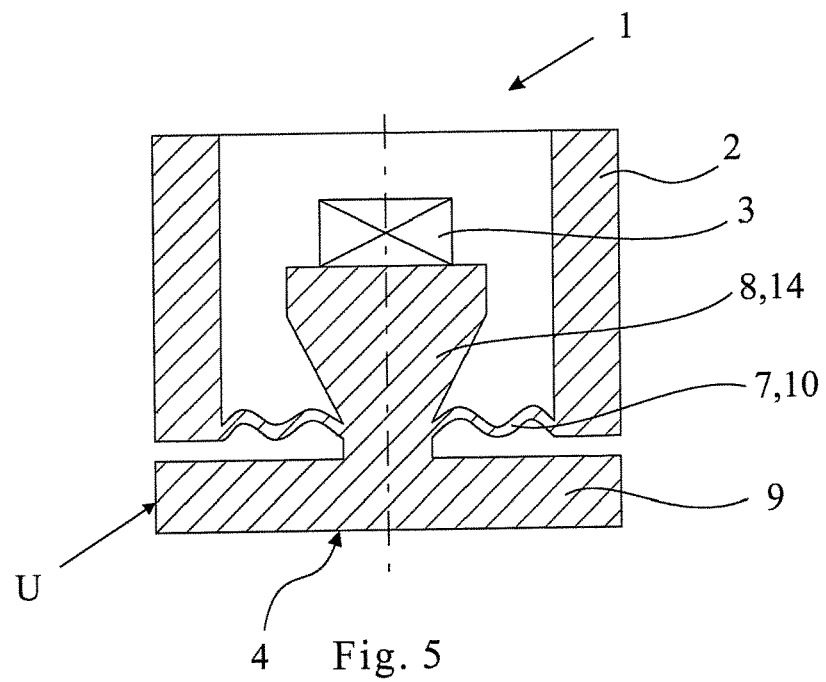
FIG. 5 shows the ultrasonic transducer from FIG. 4 with a membrane which is made corrugated as the connecting element.

The embodiment of the ultrasonic transducer 1 shown in FIG. 5 differs from the embodiment shown in FIG. 4 in that the membrane 10 is made corrugated. This still further increases the elasticity of the membrane 10 and further reduces the stiffness of the membrane 10 and this results in a fundamental natural frequency which is lower as compared to the embodiment in FIG. 4.

Figure 6:
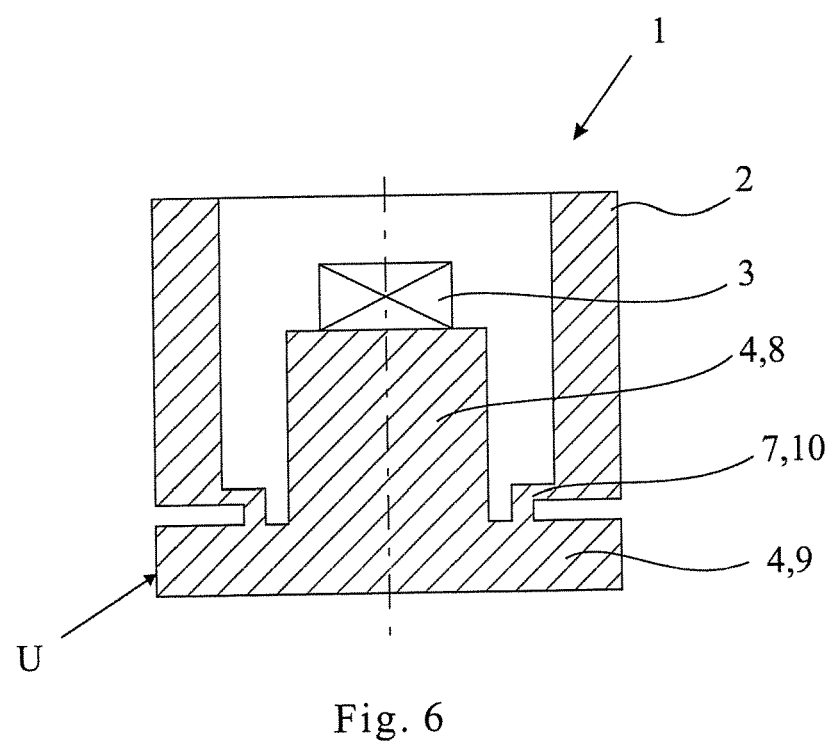
FIG. 6 shows a fifth configuration of the ultrasonic transducer in accordance with the invention and FIG. 7 shows a sixth configuration of the ultrasonic transducer as claimed in the invention.

FIG. 6 shows an ultrasonic transducer 1 in which the membrane is connected not to the plunger shaft 8, but to the plunger plate 9. The plunger plate 9 is still freely standing on its periphery U so that it can oscillate freely.

Figure 7:
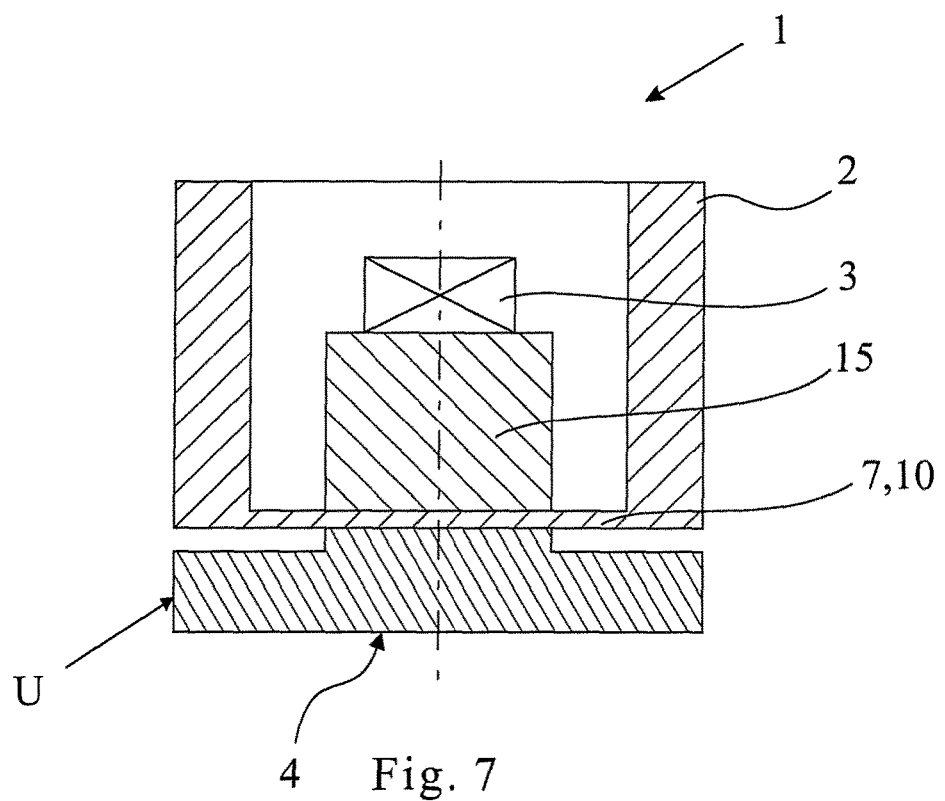

FIG. 7 shows another embodiment of the ultrasonic transducer. The membrane 10 is made here such that it seals the entire transducer housing 2. The emitting element 4 is then connected to the membrane 10 on the side of the membrane 10 facing away from the transducer element 3. Between the transducer element 3 and the membrane 10 there is a line element 15 which relays the ultrasonic signals which have been generated by the transducer element 3 via the membrane 10 to the emitting element 4. Therefore, the emitting element 4 is exposed here to the ultrasonic signals indirectly via the line element 15 and the membrane 10 and not directly, as in the configurations of the ultrasonic transducer 1 which are shown in FIGS. 2 to 6.

What is claimed is:

1. An ultrasonic transducer for an ultrasonic flow meter, comprising:
   a transducer housing,
   a transducer element for at least one of generating and receiving ultrasonic signals and
   an emitting element, the emitting element being exposed to ultrasonic signals from the transducer element and emitting the ultrasonic signals via an end face on a front side of the emitting element into the vicinity bordering the ultrasonic transducer and/or the emitting element picking up ultrasonic signals from the vicinity via the end face on the front side of the emitting element and transmitting them to the transducer element,
   wherein the emitting element is connected to the transducer housing via a connecting element and is peripherally free standing on the front side such that it can oscillate freely at its periphery, and wherein the emitting element comprises a plunger having a plunger shaft and a plunger plate, the end face being provided on the plunger plate, the plunger plate being located outside of the transducer housing with the plunger extending into the transducer housing.

2. The ultrasonic transducer as claimed in claim 1, wherein the plunger shaft projects at least partially into the transducer housing.

3. The ultrasonic transducer as claimed in claim 1, wherein the plunger shaft is columnar.

4. The ultrasonic transducer as claimed in claim 1, wherein the plunger shaft has a cross section that is one of round, rectangular or polygonal.

5. The ultrasonic transducer as claimed in claim 1, wherein the plunger shaft has a cross section which tapers away from the transducer element.

6. The ultrasonic transducer as claimed in claim 5, wherein the plunger shaft is shaped as an acoustic horn.

7. The ultrasonic transducer as claimed in claim 1, wherein the connecting element is a membrane.

8. The ultrasonic transducer as claimed in claim 7, wherein the membrane is corrugated.

9. The ultrasonic transducer as claimed in claim 1, wherein the transducer housing and the connecting element have a one piece construction.

10. The ultrasonic transducer as claimed in claim 1, wherein the transducer housing, the connecting element and the emitting element have a one piece construction.

11. The ultrasonic transducer as claimed in claim 1, wherein the connecting element and the emitting element have a once piece construction.

12. The ultrasonic transducer as claimed in claim 1, wherein the transducer housing, the connecting element and the emitting element are welded to one another.

13. The ultrasonic transducer as claimed in claim 1, wherein the connecting element and the emitting element are welded to one another.

14. The ultrasonic transducer as claimed in claim 1, wherein an elastic material is provided between the emitting element and the connecting element.

15. The ultrasonic transducer as claimed in claim 14, wherein the elastic material is formed by O-rings.

* * * * *